(12) United States Patent
Kikuchi et al.

(10) Patent No.: US 8,986,834 B2
(45) Date of Patent: Mar. 24, 2015

(54) POLYESTER IMIDE RESIN INSULATING COATING MATERIAL, INSULATED WIRE USING SAME, AND COIL

(75) Inventors: Hideyuki Kikuchi, Hitachi (JP); Yasuhiro Funayama, Hitachi (JP); Hidehito Hanawa, Hitachi (JP); Yuki Honda, Hitachi (JP); Takami Ushiwata, Hitachi (JP); Shuta Nabeshima, Hitachi (JP)

(73) Assignee: Hitachi Metals, Ltd., Tokyo (JP)

( * ) Notice: Subject to any disclaimer, the term of this patent is extended or adjusted under 35 U.S.C. 154(b) by 621 days.

(21) Appl. No.: 13/137,329

(22) Filed: Aug. 5, 2011

(65) Prior Publication Data

US 2012/0048592 A1 Mar. 1, 2012

(30) Foreign Application Priority Data

Aug. 25, 2010 (JP) ................................. 2010-187741

(51) Int. Cl.
| | | |
|---|---|---|
| *H01B 7/00* | (2006.01) | |
| *C09D 179/08* | (2006.01) | |
| *C08G 73/16* | (2006.01) | |
| *C08G 73/10* | (2006.01) | |
| *C08G 73/14* | (2006.01) | |
| *H01B 3/30* | (2006.01) | |

(52) U.S. Cl.
CPC ............ *C08G 73/16* (2013.01); *C08G 73/10* (2013.01); *C08G 73/14* (2013.01); *C09D 179/08* (2013.01); *H01B 3/306* (2013.01)
USPC ..... 428/379; 428/375; 428/383; 174/120 SR; 174/110 R; 174/110 SR; 524/602; 524/589; 524/590

(58) Field of Classification Search
None
See application file for complete search history.

(56) References Cited

U.S. PATENT DOCUMENTS

| | | | | |
|---|---|---|---|---|
| 3,274,143 | A * | 9/1966 | Hostettler et al. | 524/310 |
| 4,075,179 | A * | 2/1978 | Karkoski et al. | 528/289 |
| 4,119,608 | A * | 10/1978 | Keating | 528/188 |
| 4,129,678 | A * | 12/1978 | Seki et al. | 428/383 |
| 4,233,435 | A * | 11/1980 | Boldebuck et al. | 528/350 |
| 4,307,226 | A * | 12/1981 | Bolon et al. | 528/288 |
| 4,362,861 | A * | 12/1982 | Shen | 528/289 |
| 5,438,105 | A * | 8/1995 | Nagata | 525/436 |
| 5,668,247 | A * | 9/1997 | Furutani et al. | 528/353 |
| 6,046,072 | A * | 4/2000 | Matsuura et al. | 438/118 |
| 6,184,333 | B1 * | 2/2001 | Gray | 528/170 |
| 6,248,613 | B1 * | 6/2001 | Matsuura et al. | 438/106 |
| 6,372,080 | B1 * | 4/2002 | Matsuura et al. | 156/313 |
| 6,558,791 | B2 * | 5/2003 | Matsuura et al. | 428/355 CN |

(Continued)

FOREIGN PATENT DOCUMENTS

JP 2009-277369 11/2009

*Primary Examiner* — Jill Gray
(74) *Attorney, Agent, or Firm* — McGinn IP Law Group, PLLC

(57) ABSTRACT

A insulated wire includes a conductor, and an insulating coating on a periphery of the conductor. The insulating coating includes an insulating film formed by applying and baking a polyester imide resin insulating coating material, and the insulating film has a relative permittivity of less than 3.5 both in a dried state and in a moisture-absorbed state. The insulating film is formed by applying and baking a polyester imide resin insulating coating material including an imide dicarboxylic acid and an alcohol component, the imide dicarboxylic acid being obtained by synthesizing a diamine component including aromatic diamine having not less than three aromatic rings and an acid component including aromatic tricarboxylic acid anhydride.

20 Claims, 1 Drawing Sheet

(56) References Cited

U.S. PATENT DOCUMENTS

| | | | |
|---|---|---|---|
| 8,193,451 B2* | 6/2012 | Kikuchi et al. | 174/110 R |
| 2007/0292701 A1* | 12/2007 | Kikuchi et al. | 428/458 |
| 2009/0176961 A1* | 7/2009 | Kikuchi et al. | 528/59 |
| 2011/0198109 A1* | 8/2011 | Nabeshima et al. | 174/120 C |
| 2013/0098656 A1* | 4/2013 | Saito et al. | 174/110 SR |
| 2013/0153262 A1* | 6/2013 | Saito et al. | 174/110 SR |
| 2013/0161061 A1* | 6/2013 | Honda et al. | 174/110 SR |
| 2013/0161065 A1* | 6/2013 | Honda et al. | 174/120 SR |

* cited by examiner

POLYESTER IMIDE RESIN INSULATING COATING MATERIAL, INSULATED WIRE USING SAME, AND COIL

The present application is based on Japanese Patent Application No. 2010-187741 filed on Aug. 25, 2010, the entire contents of which are incorporated herein by reference.

BACKGROUND OF THE INVENTION

1. Field of the Invention

The invention relates to a polyester imide resin insulating coating material used for an insulating coating of magnet wire, etc., and in particular, to a polyester imide resin insulating coating material by which a polyester imide resin based insulating film having improved partial discharge resistant characteristics is obtained, and an insulated wire having an insulated film formed of the coating material.

2. Description of the Related Art

As an insulated wire used for a coil of electric equipment such as motor or transformer, an insulated wire having an insulating film formed of a polyester imide resin insulating coating material formed by adding an alcohol component as a crosslinking component to an imide dicarboxylic acid which is obtained by synthesizing a diamine component and an acid component such as tricarboxylic acid anhydride so as to be an excessive acid state is generally used for an application requiring heat resistance greater than that of Class F. In addition, an insulated wire in which a polyamide imide resin-based insulating film, an insulating film having self-lubricating properties or an insulating film having self-bonding properties is formed on the insulating film formed of the polyester imide resin insulating coating material as described above is also used. The polyester imide resin insulating coating material and the insulated wire having an insulating film formed thereof are widely used since high heat resistance is obtained with relatively low cost.

Specifically, as the most versatile polyester imide resin insulating coating material at the moment, there is a THEIC modified polyester imide which is formed by adding an alcohol component formed of tris(2-hydroxyethyl)isocyanurate (THEIC) to an imide dicarboxylic acid. The polyester imide resin insulating coating material can improve heat resistance and refrigerant resistance since glycerin or THEIC, etc., which is a trifunctional alcohol component is introduced therein as a crosslinking component.

On the other hand, a motor, etc., is recently often driven by inverter in order to improve efficiency of a coil of electric equipment such as a motor. There are many cases that partial discharge occurs between adjacent insulated wires due to generation of excessive voltage (inverter surge voltage) in a coil during such inverter drive and causes deterioration of an insulating film, leading to breakdown.

As a method of reducing the deterioration of an insulation film caused by partial discharge, for example, JP-A 2009-277369 proposes an insulated wire composed of a conductor and an insulating film for coating the conductor and having an insulating layer formed by applying and baking a mixed resin of polyester imide and polyether sulfone. According to JP-A 2009-277369, an insulated wire with high corona inception voltage (partial discharge inception voltage) (the peak value of about 940V and the effective value of about 670V) as well as excellent in mechanical strength such as hardness or in heat resistance is obtained by providing the insulation layer formed by applying and baking a resin composition including a mixed resin of polyester imide and polyether sulfone.

SUMMARY OF THE INVENTION

Recently, since improvement in a space factor of an insulated wire with respect to a coil is further demanded and driving voltage of motor tends to be increased in accordance with further improved efficiency and higher power of electric equipments, there is a much higher risk that partial discharge occurs in the insulated wire. Therefore, it is required to further improve partial discharge inception voltage (e.g., partial discharge inception voltage of not less than 980 Vp) without increasing a thickness of an insulating coating with respect to the insulated wire than that of the conventional art in order to prevent partial discharge from occurring around the insulated wire. Here, the partial discharge inception voltage is a value measured by a commercially available partial discharge test equipment. A measurement temperature, AC voltage frequency used and measurement sensitivity, etc., are appropriately changed, and the value mentioned above is a peak value of voltage at which partial discharge occurs when measurement is carried out at 25° C., 50 Hz and 10 pC.

In the conventional insulated wire described in JP-A 2009-277369, partial discharge inception voltage is not sufficient and it is considered that the partial discharge inception voltage can be increased by increasing the thickness of the insulation layer, however, improvement in a space factor may be impaired since the thickness of the whole insulating coating is also increased.

Accordingly, it is an object of the invention to provide a polyester imide resin insulating coating material that can form an insulating coating with a partial discharge inception voltage higher than that of the conventional one while having the thickness equivalent to that of the conventional one, and an insulated wire with an insulating coating including an insulating film formed by applying and baking the insulating coating material.

(1) According to one embodiment of the invention, an insulated wire comprises:
  a conductor; and
  an insulating coating on a periphery of the conductor,
  wherein the insulating coating comprises an insulating film formed by applying and baking a polyester imide resin insulating coating material, and the insulating film has a relative permittivity of less than 3.5 both in a dried state and in a moisture-absorbed state.

In the above embodiment (1) of the invention, the following modifications and changes can be made.

(i) The insulating film is formed by applying and baking a polyester imide resin insulating coating material comprising an imide dicarboxylic acid and an alcohol component, the imide dicarboxylic acid being obtained by synthesizing a diamine component including aromatic diamine having not less than three aromatic rings and an acid component including aromatic tricarboxylic acid anhydride.

(ii) The aromatic diamine having not less than three aromatic rings is included in the diamine component at a rate of 30 to 100 mol %.

(iii) The aromatic diamine having not less than three aromatic rings comprises one selected from 2,2-bis[4-(4-aminophenoxy)phenyl]propane, bis[4-(4-aminophenoxy)phenyl]sulfone, bis[4-(4-aminophenoxy)phenyl]ether, fluorenediamine, 4,4'-bis(4-aminophenoxy)biphenyl, and 1,4-bis(4-aminophenoxy)benzene.

(iv) The insulating coating further comprises a resin layer comprising as a main component one selected from polyamide-imide resin, polyimide resin, polyester imide resin, and class H polyester resin.

(2) According to another embodiment of the invention, a polyester imide resin insulating coating material for being applied and baked on a conductor to form an insulating film for an insulated wire, wherein the insulating film has a relative permittivity of less than 3.5 both in a dried state and in a moisture-absorbed state.

In the above embodiment (2) of the invention, the following modifications and changes can be made.

(v) The polyester imide resin insulating coating material comprises an imide dicarboxylic acid and an alcohol component, the imide dicarboxylic acid being obtained by synthesizing a diamine component including aromatic diamine having not less than three aromatic rings and an acid component including aromatic tricarboxylic acid anhydride.

(vi) The aromatic diamine having not less than three aromatic rings is included in the diamine component at a rate of 30 to 100 mol %.

(vii) The aromatic diamine having not less than three aromatic rings comprises one selected from 2,2-bis[4-(4-aminophenoxy)phenyl]propane, bis[4-(4-aminophenoxy)phenyl]sulfone, bis[4-(4-aminophenoxy)phenyl]ether, fluorenediamine, 4,4'-bis(4-aminophenoxy)biphenyl, and 1,4-bis(4-aminophenoxy)benzene.

(3) According to another embodiment of the invention, a coil formed using the insulated wire according to the above embodiment (1) is provided.

Effects of the Invention

According to one embodiment of the invention, a polyester imide resin insulating coating material can be provided that forms an insulating coating with a partial discharge inception voltage higher than that of the conventional one while having the thickness equivalent to that of the conventional one, and an insulated wire with an insulating coating including an insulating film formed by applying and baking the insulating coating material.

BRIEF DESCRIPTION OF THE DRAWINGS

Next, the present invention will be explained in more detail in conjunction with appended drawings, wherein.

DETAILED DESCRIPTION OF THE PREFERRED EMBODIMENTS

Figure 1:
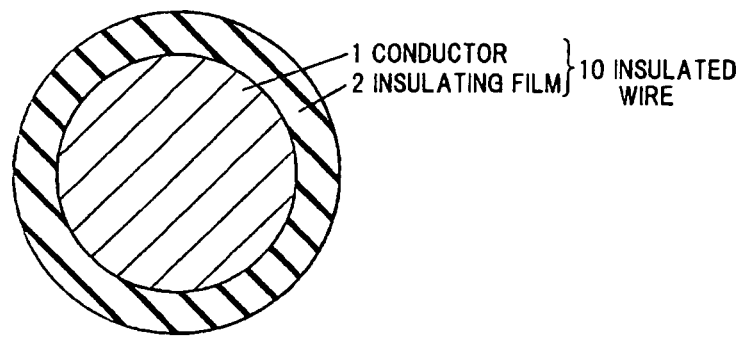
FIG. 1 is a cross sectional view showing an example of an insulated wire in an embodiment of the present invention.

An embodiment of the invention will be described below referring to the drawings and Examples, however, the scope of the invention is not intended to be limited to the embodiment and Examples described herein, and various changes and modifications can be made without changing the gist of the invention.

Polyester Imide Resin Insulating Coating Material

A polyester imide resin insulating coating material of the invention used for an insulated wire is applied and baked on a conductor to form an insulating film, and a relative permittivity of the insulating film formed by applying and baking the polyester imide resin insulating coating material is less than 3.5 both in a dried state and in a moisture-absorbed state. By providing an insulating film which is formed by applying and baking such a polyester imide resin insulating coating material, it is possible to further improve partial discharge inception voltage (e.g., partial discharge inception voltage of not less than 980 Vp) without increasing a thickness of an insulating coating than that of the conventional art and thus to prevent partial discharge from occurring. In other words, it is possible to provide an insulated wire with partial discharge inception voltage higher than that of the conventional art while having the insulating coating thickness equivalent to that of the conventional art. In addition to the case described above, a ratio of a relative permittivity of the insulation film in a moisture-absorbed state ($\epsilon 1$) to a difference thereof from a relative permittivity in a dried state (a) is less than 2% (($\epsilon 1 - \epsilon 2$)/($\epsilon 1$)×100<2.0[%]), hence, it is possible to obtain high partial discharge inception voltage more effectively.

A polyester imide resin insulating coating material allowing an insulating film as described above to be obtained is formed by, e.g., an esterification reaction of an alcohol component with an imide dicarboxylic acid which is obtained by synthesizing a diamine component including aromatic diamine having three or more aromatic rings and an acid component including tricarboxylic acid anhydride. Meanwhile, there is a method in which an imide dicarboxylic acid is reacted with an alcohol component by collectively introducing raw materials such as diamine component, acid component and alcohol component. Although there is a method in which a preliminarily reacted polyester component other than imidized component is imidized by subsequently adding an imidic acid component, an insulating film having a relative permittivity of less than 3.5 both in a dried state and in a moisture-absorbed state while maintaining heat resistance may be difficult to be obtained from a polyester imide resin insulating coating material obtained by this method.

Diamine Component

A diamine component including aromatic diamine having three or more aromatic rings is used in order to reduce the relative permittivity of the insulating film in a dried state as well as in a moisture-absorbed state while maintaining heat resistance. The aromatic diamine having three or more aromatic rings includes 2,2-bis[4-(4-aminophenoxy)phenyl]propane (BAPP), bis[4-(4-aminophenoxy)phenyl]sulfone (BAPS), bis[4-(4-aminophenoxy)phenyl]ether (BAPE), fluorenediamine (FDA), 4,4'-bis(4-aminophenoxy)biphenyl (BAPB) and 1,4-bis(4-aminophenoxy)benzene, etc., and an isomer thereof. It is possible to use one or more of such aromatic diamines.

In addition, for the diamine component, it is possible to use an aromatic diamine such as 4,4'-diaminodiphenylmethane (DAM) or 4,4'-diaminodiphenyl ether (DDE) in combination with the aromatic diamine having three or more aromatic rings, however, it is not specifically limited thereto. Furthermore, a raw material having an alicyclic structure may be used together by appropriately controlling a compounding amount or a chemical structure without deteriorating heat resistance since effects of reducing the relative permittivity or improving transparency of resin composition are expected.

The aromatic diamine having three or more aromatic rings is preferably included in the diamine component at a rate of 30 to 100 mol %.

Acid Component

An acid component essentially includes tricarboxylic acid anhydride such as trimellitic anhydride (TMA), 3,4,4'-benzophenone tricarboxylic acid anhydride or 3,4,4'-biphenyl tricarboxylic acid anhydride, and the trimellitic anhydride is preferable.

In addition, for the acid component, it is possible to use tetracarboxylic dianhydride in combination with tricarboxylic acid anhydride. The tetracarboxylic dianhydride includes aromatic tetracarboxylic dianhydride such as pyromellitic dianhydride (PMDA), 3,3',4,4'-benzophenone-tetracarboxylic dianhydride (BTDA), 3,3',4,4'-diphenyl sulfone-tetracarboxylic dianhydride (DSDA), 4,4'-oxydiphthalic dianhydride (ODPA) and 3,3',4,4'-biphenyl sulfone tetracarboxylic dianhydride, etc.

In addition, alicyclic tetracarboxylic dianhydride such as butane tetracarboxylic dianhydride or 5-(2,5-dioxotetrahydro-3-furanyl)-3-methyl-3-cyclohexene-1,2-dicarboxylic anhydride, or alicyclic tetracarboxylic dianhydride which is a hydrogenated aromatic tetracarboxylic dianhydride as exemplified above, etc., may be used in combination with tricarboxylic acid anhydride if necessary. In this case, however, it is necessary to adjust the molar ratio so as to be terminated with dicarboxylic acid.

In addition, it is possible to use dicarboxylic acid in combination with tricarboxylic acid anhydride. As the dicarboxylic acid, it is possible to use, e.g., aromatic dicarboxylic acid such as terephthalic acid (TPA), isophthalic acid and naphthalene dicarboxylic acid, and alkyl ester thereof such as dimethyl terephthalate (DMT) or dimethyl isophthalate, etc., and the dimethyl terephthalate is preferable. Alternatively, a tricarboxylic acid having an isocyanurate ring such as CIC acid or an aromatic tricarboxylic acid such as trimesic acid may be used in some cases.

Alcohol Component

As an alcohol component, a polyhydric alcohol is preferable, which includes, e.g., dihydric alcohol such as ethylene glycol (EG), neopentyl glycol, 1,4-butanediol, 1,6-hexanediol or 1,6-cyclohexane dimethanol, trihydric or more alcohol such as glycerin (G), trimethylolpropane or pentaerythritol, and alcohol having an isocyanurate ring, etc. Alcohol having an isocyanurate ring includes tris(hydroxymethyl) isocyanurate, tris(2-hydroxyethyl) isocyanurate (THEIC) and tris(3-hydroxypropyl) isocyanurate, etc.

Synthesis Method of Polyester Imide Resin Insulating Coating Material

The polyester imide resin insulating coating material is a resin including an ester bond and an imide bond in a molecule thereof, and is formed by reacting alcohol with imide dicarboxylic acid. Imide dicarboxylic acid, which is made from an acid component and a diamine component, is esterified by being reacted with a portion or a suitable amount of an alcohol component to form a polyester imide resin.

In the synthesis method of polyester imide resin insulating coating material, a diamine component including aromatic diamine with three or more aromatic rings such as 2,2-bis[4-(4-aminophenoxy)phenyl]propane (BAPP) is reacted with an acid component including tricarboxylic acid anhydride such as trimellitic anhydride (TMA) to obtain an imide dicarboxylic acid. Then, the imide dicarboxylic acid obtained is esterified by being reacted with an alcohol component such as tris(2-hydroxyethyl) isocyanurate (THEIC) or ethylene glycol (EG) to obtain the polyester imide resin insulating coating material of the invention.

The synthesis reaction of the imide dicarboxylic acid and the alcohol component is conducted such that a diamine component is firstly reacted with an acid component in a first reaction step, and an alcohol component is then added to react with the imide dicarboxylic acid obtained in the first reaction step in a second reaction step, or such that an imide dicarboxylic acid made from a diamine component and an acid component is reacted with an alcohol component by simultaneously putting the respective components, diamine, acid and alcohol component into a flask with a stirrer, a reflux cooling tube, a nitrogen inlet tube and a thermometer.

In reacting the imide dicarboxylic acid with the alcohol component, a molar ratio of the alcohol component to the acid component (OH/COOH) is desirably 1.2 to 2.5, and more desirably, 1.5 to 2.3 in light of balance of characteristics of the insulating coating.

It is preferred that the polyester imide resin insulating coating material is synthesized with an organic solvent including phenols such as cresol or a mixed organic solvent including propylene carbonate and phenols because of facilitating the control of the synthesis system. The polyester imide resin insulating coating material of the embodiment can be efficiently produced due to the facilitated control of the synthesis system. By using the polyester imide resin insulating coating material thus produced, an insulating film with the relative permittivity as defined earlier can be stably obtained. If necessary, aromatic alkyl benzenes may be used for dilution.

Meanwhile, a phenolic resin, a xylene resin or blocked isocyanate may be added in order to improve the characteristics such as flexibility and abrasion resistance, or thiol compound, melamine or tetrazole, etc., including S (sulfur) or N (nitrogen) which forms a complex with a copper conductor may be added if necessary.

In reacting the imide dicarboxylic acid with the alcohol component, a curing catalyst or an organic acid metal salt may be used if necessary. The curing catalyst may be titanium alkoxide such as tetrabutyl titanate (TBT), tetrapropyl titanate (TPT) and a polymer thereof. Metal alkoxide other than titanium may be used. The organic acid metal salt may be manganese-based or zinc-based in order to improve the characteristics.

Furthermore, various additive agents such as colorant, dye, inorganic or organic filler, lubricant agent, antioxidant and leveling agent, etc., may be included without impeding the object of the invention.

Insulated Wire

Figure 2:
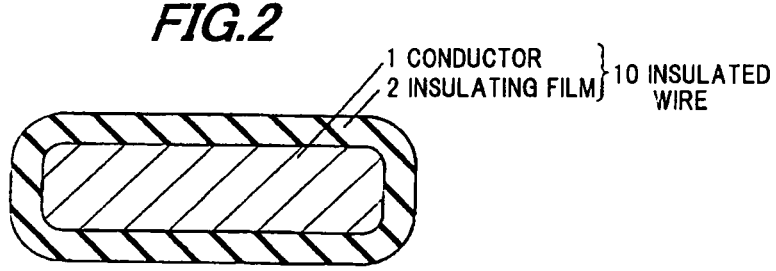
FIG. 2 is a cross sectional view showing an example of an insulated wire in the embodiment of the invention.

As shown in FIGS. 1 and 2, an insulated wire of the invention is an insulated wire 10 having an insulating coating in which an insulating film 2 is formed by applying and baking a polyester imide resin insulating coating material on a conductor 1 or on another resin layer formed on a conductor, and the insulating film 2 has a relative permittivity of less than 3.5 both in a dried state and in a moisture-absorbed state. Preferably, a ratio of a relative permittivity of the insulating film 2 in a moisture-absorbed state ($\epsilon 1$) to a difference thereof from a relative permittivity in a dried state ($\epsilon 2$) is less than 2% (($\epsilon 1-\text{E}2$)/($\epsilon 1$)×100<2.0[%]).

Here, the relative permittivity is obtained as follows. A metal electrode is deposited on a surface of the insulated wire, and capacitance between the conductor and the metal electrode is measured by using a commercially available impedance analyzer (at a frequency of 1 kHz). Thereupon, the relative permittivity ($\epsilon_s$) is calculated by the following formula (1):

$$\epsilon_s = (c/2\pi\epsilon_0) \times \ln(D/d) \times (1/L) \qquad (1)$$

where c represents the measured capacitance, L represents a length of the metal electrode, D represents an outer diameter of the insulated wire, d represents an outer diameter of the conductor, and $\epsilon_0$ represents a vacuum permittivity.

Meanwhile, the relative permittivity in a dried state is a relative permittivity obtained by leaving the insulated wire in a constant-temperature bath at a temperature of 100° C. for 50 hours and then calculating based on capacitance which is measured in the constant-temperature bath by the measuring method described above. Then, the relative permittivity in a moisture-absorbed state is a relative permittivity obtained by leaving the insulated wire in a constant temperature and humidity bath at a temperature of 25° C. and at a humidity of 50% RH for 50 hours and then calculating based on capacitance which is measured in the constant temperature and humidity bath by the measuring method described above.

In the insulated wire of the invention, other metal wires, etc., formed of silver, etc., are also used as the conductor 1 besides a copper wire formed of low-oxygen copper or oxygen-free copper, etc., or a copper alloy wire. Meanwhile, the cross-sectional shape of the conductor 1 is not specifically limited, and a conductor having a cross-sectional shape of, e.g., a circle or rectangle (including a rectangle having four rounded corners) as shown in FIGS. 1 and 2 is used.

The insulating coating may have another resin layer under or on the insulating film 2. For example, a resin layer mainly formed of one or more resins selected from polyamide-imide resin, polyimide resin, polyester imide resin and class H polyester resin may be provided under or on the insulating film 2 in order to improve adhesion between the conductor 1 and the insulating film 2 or to improve lubricity on the surface of the insulating coating, etc.

EXAMPLES

Preparation of Polyester Imide Resin Insulating Coating Material

For making insulated wired in Examples and Comparative Examples, a polyester imide resin insulating coating material was prepared by the following method.

Raw materials and solvents shown in Examples 1 to 6 and Comparative Examples 1 and 2 were introduced into a flask provided with a stirrer, a reflux cooling tube, a nitrogen inlet tube and a thermometer at a time, were heated to 170° C. within about 1 hour while stirring in a nitrogen atmosphere and then reacted for 3 hours, and were subsequently reacted for 8 hours after further increasing to the temperature of 220° C. The resin solution was appropriately diluted and a curing agent (TBT) as well as a phenolic resin were added thereto, thereby making a polyester imide resin insulating coating material.

Making Insulated Wire

An insulating film was formed by applying and baking the polyester imide resin insulating coating material obtained by the preparation on a 0.8 mm copper conductor, thereby obtaining the insulated wires in Examples 1 to 6 and Comparative Examples 1 and 2.

Example 1

136.2 g portion of 4,4'-bis(4-aminophenoxy)biphenyl (BAPB) as a diamine component, 95.1 g portion of dimethyl terephthalate (DMT) and 142.1 g portion of trimellitic anhydride (TMA) as acid components, and 156.6 g portion of tris(2-hydroxyethyl) isocyanurate (THEIC) and 49.6 g portion of ethylene glycol (EG) as alcohol components were introduced and synthesized, thereby obtaining a polyester imide resin insulating coating material. A 45 μm thick insulating film was formed by applying and baking the polyester imide resin insulating coating material on a 0.8 mm copper conductor, thereby obtaining an insulated wire.

Example 2

142.1 g portion of bis[4-(4-aminophenoxy)phenyl]ether (BAPE) as a diamine component, 95.1 g portion of DMT and 142.1 g portion of TMA as acid components, and 156.6 g portion of THEIC and 49.6 g portion of EG as alcohol components were introduced and synthesized, thereby obtaining a polyester imide resin insulating coating material. A 45 μm thick insulating film was formed by applying and baking the polyester imide resin insulating coating material on a 0.8 mm copper conductor, thereby obtaining an insulated wire.

Example 3

99.8 g portion of BAPE as a diamine component, 133.9 g portion of DMT and 99.8 g portion of TMA as acid components, and 156.6 g portion of THEIC and 57.7 g portion of EG as alcohol components were introduced and synthesized, thereby obtaining a polyester imide resin insulating coating material. A 46 μm thick insulating film was formed by applying and baking the polyester imide resin insulating coating material on a 0.8 mm copper conductor, thereby obtaining an insulated wire.

Example 4

176.6 g portion of BAPE as a diamine component, 58.2 g portion of DMT and 176.6 g portion of TMA as acid components, and 112.2 g portion of THEIC and 55.2 g portion of EG as alcohol components were introduced and synthesized, thereby obtaining a polyester imide resin insulating coating material. A 45 μm thick insulating film was formed by applying and baking the polyester imide resin insulating coating material on a 0.8 mm copper conductor, thereby obtaining an insulated wire.

Example 5

151.7 g portion of 2,2-bis[4-(4-aminophenoxy)phenyl] propane (BAPP) as a diamine component, 95.1 g portion of DMT and 142.1 g portion of TMA as acid components, and 156.6 g portion of THEIC and 49.6 g portion of EG as alcohol components were introduced and synthesized, thereby obtaining a polyester imide resin insulating coating material. A 46 μm thick insulating film was formed by applying and baking the polyester imide resin insulating coating material on a 0.8 mm copper conductor, thereby obtaining an insulated wire.

Example 6

241.9 g portion of BAPP as a diamine component, 75.7 portion of DMT, 113.3 g portion of TMA and 91.5 g portion of 4,4'-oxydiphthalic dianhydride (ODPA) as acid components, and 52.2 g portion of THEIC, 26.7 g portion of glycerin (G) and 39.7 g portion of EG as alcohol components were introduced and synthesized, thereby obtaining a polyester imide resin insulating coating material. A 45 μm thick insulating film was formed by applying and baking the polyester imide resin insulating coating material on a 0.8 mm copper conductor, thereby obtaining an insulated wire.

Comparative Example 1

73.3 g portion of 4,4'-diaminodiphenylmethane (DAM) as a diamine component, 108.6 g portion of DMT and 142.1 g portion of TMA as acid components, and 174.9 g portion of THEIC and 41.5 g portion of EG as alcohol components were introduced and synthesized, thereby obtaining a polyester imide resin insulating coating material. A 46 μm thick insulating film was formed by applying and baking the polyester imide resin insulating coating material on a 0.8 mm copper conductor, thereby obtaining an insulated wire.

Comparative Example 2

51.5 g portion of DAM as a diamine component, 133.9 g portion of DMT and 99.8 g portion of TMA as acid components, and 156.6 g portion of THEIC and 58.3 g portion of EG as alcohol components were introduced and synthesized, thereby obtaining a polyester imide resin insulating coating material. A 45 μm thick insulating film was formed by applying and baking the polyester imide resin insulating coating material on a 0.8 mm copper conductor, thereby obtaining an insulated wire.

Table 1 shows a raw material composition of the polyester imide resin insulating coating material and characteristics of the insulated wires in Examples 1 to 6 and Comparative Examples 1 and 2.

The general characteristics (dimension, flexibility, abrasion resistance, heat resistance and softening resistant temperature) of the insulated wires were measured by a method in accordance with JIS C 3003.

Method of Measuring Partial Discharge Inception Voltage

Meanwhile, for the partial discharge inception voltage, the obtained insulated wire was placed in a constant temperature and humidity bath at a temperature of 25° C. and at a humidity of 50% RH and was then left for 50 hours, and a peak value of voltage at which partial discharge occurs was measured using a commercially available partial discharge test equipment under the measurement conditions of a temperature of 25° C., a frequency of 50 Hz and a detection sensitivity of 10 pC.

Method of Measuring Relative Permittivity

Then, for the relative permittivity in a dried state, the obtained insulated wire was left in a constant-temperature bath at a temperature of 100° C. for 50 hours, a metal electrode was subsequently deposited on a surface of the insulated wire in the constant-temperature bath, capacitance between the conductor and the metal electrode was measured using a commercially available impedance analyzer (at a frequency of 1 kHz). Thereupon, the relative permittivity ($\epsilon_s$) in the dried state is calculated by the following formula (1):

$$\epsilon_s = (c/2\pi\epsilon_0) \times \ln(D/d) \times (1/L) \tag{1}$$

where c represents the measured capacitance, L represents a length of the metal electrode, D represents an outer diameter of the insulated wire, d represents an outer diameter of the conductor, and $\epsilon_0$ represents a vacuum permittivity.

On the other hand, for the relative permittivity in a moisture-absorbed state, the insulated wire was left in a constant temperature and humidity bath at a temperature of 25° C. and at a humidity of 50% RH for 50 hours, capacitance was subsequently measured in the constant temperature and humidity bath by the same measuring method as for the relative permittivity in a dried state. Thereupon, the relative permittivity ($\epsilon_s$) in the moisture-absorbed state is calculated by the following formula (1):

$$\epsilon_s = (c/2\pi\epsilon_0) \times \ln(D/d) \times (1/L) \tag{1}$$

where c represents the measured capacitance, L represents a length of the metal electrode, D represents an outer diameter of the insulated wire, d represents an outer diameter of the conductor, and $\epsilon_0$ represents a vacuum permittivity.

TABLE 1

| | | | Example 1 | Example 2 | Example 3 | Example 4 | Example 5 |
|---|---|---|---|---|---|---|---|
| Raw material composition of Polyester imide resin insulating coating material | Diamine component | BAPB | 136.2 | | | | |
| | | BAPE | | 142.1 | 99.8 | 176.6 | |
| | | BAPP | | | | | 151.7 |
| | | DAM | | | | | |
| | Acid component | DMT | 95.1 | 95.1 | 133.9 | 58.2 | 95.1 |
| | | TMA | 142.1 | 142.1 | 99.8 | 176.6 | 142.1 |
| | | ODPA | | | | | |
| | Alcohol component | THEIC | 156.6 | 156.6 | 156.6 | 112.2 | 156.6 |
| | | G | | | | | |
| | | EG | 49.6 | 49.6 | 57.5 | 55.2 | 49.6 |
| | Solvent | Synthesis cresol | 600 | 700 | 650 | 650 | 200 |
| | | Propylene carbonate | | | | | 570 |
| | | Aromatic alkyl benzene | 150 | 60 | 60 | 100 | |
| Characteristics of Insulated wire | Dimension | Conductor diameter (mm) | 0.800 | 0.800 | 0.800 | 0.800 | 0.800 |
| | | Film thickness (polyester imide layer/mm) | 0.045 | 0.045 | 0.046 | 0.045 | 0.046 |
| | | Overall diameter (mm) | 0.890 | 0.890 | 0.891 | 0.890 | 0.891 |
| | Flexibility | Self-diameter winding | Pass | Pass | Pass | Pass | Pass |
| | Abrasion resistance | Unidirectional abrasion (N) | 15.5 | 14.9 | 14.6 | 15.0 | 14.7 |
| | Heat resistance | Breakdown retention rate (%) (240° C. × 168 h) | 75.8 | 75.6 | 76.8 | 78.0 | 76.9 |
| | Softening resistant temperature | Temperature programming (° C.) | 394 | 390 | 385 | 384 | 386 |
| | Relative permittivity | Dried state (1 kHz) (in constant-temperature bath at 100° C.) | 3.37 | 3.40 | 3.46 | 3.42 | 3.35 |
| | | Moisture-absorbed state (1 kHz) (at 25° C. and 50% RH) | 3.42 | 3.46 | 3.49 | 3.45 | 3.40 |
| | Partial discharge inception voltage | 50 Hz, detection sensitivity of 10 pC (Vp) (at 25° C. and 50% RH) | 998 | 990 | 991 | 992 | 1010 |

| | | | Example 6 | Comparative Example 1 | Comparative Example 2 |
|---|---|---|---|---|---|
| Raw material composition of | Diamine component | BAPB | | | |
| | | BAPE | | | |

TABLE 1-continued

| | | | | | |
|---|---|---|---|---|---|
| Polyester imide resin insulating coating material | Acid component | BAPP | 241.9 | | |
| | | DAM | | 73.3 | 51.5 |
| | | DMT | 75.7 | 108.6 | 133.9 |
| | | TMA | 113.3 | 142.1 | 99.8 |
| | | ODPA | 91.5 | | |
| | Alcohol component | THEIC | 52.2 | 174.9 | 156.6 |
| | | G | 26.7 | | |
| | | EG | 39.7 | 41.5 | 58.3 |
| | Solvent | Synthesis cresol | 800 | 700 | 600 |
| | | Propylene carbonate | | | |
| | | Aromatic alkyl benzene | 30 | | 50 |
| Characteristics of Insulated wire | Dimension | Conductor diameter (mm) | 0.800 | 0.800 | 0.800 |
| | | Film thickness (polyester imide layer/mm) | 0.045 | 0.046 | 0.045 |
| | | Overall diameter (mm) | 0.890 | 0.891 | 0.890 |
| | Flexibility | Self-diameter winding | Pass | Pass | Pass |
| | Abrasion resistance | Unidirectional abrasion (N) | 14.9 | 15.1 | 14.7 |
| | Heat resistance | Breakdown retention rate (%) (240° C. × 168 h) | 78.5 | 75.4 | 76.0 |
| | Softening resistant temperature | Temperature programming (° C.) | 391 | 393 | 384 |
| | Relative permittivity | Dried state (1 kHz) (in constant-temperature bath at 100° C.) | 3.28 | 3.92 | 3.85 |
| | | Moisture-absorbed state (1 kHz) (at 25° C. and 50% RH) | 3.33 | 4.00 | 3.93 |
| | Partial discharge inception voltage | 50 Hz, detection sensitivity of 10 pC (Vp) (at 25° C. and 50% RH) | 1017 | 903 | 907 |

It is understood that the insulated wires in Examples 1 to 6, in which the relative permittivity of the insulating film is less than 3.5 both in a dried state and in a moisture-absorbed state, each have an insulating coating with a thickness equivalent to that of the conventional art and high partial discharge inception voltage of not less than 980 Vp as is obvious from the results shown in Table 1. In addition, the insulated wires in Examples 1 to 6 have the general characteristics at a level equivalent to a conventional insulated wire. On the other hand, it is understood that the insulated wires in Comparative Examples 1 and 2, in which the relative permittivity of the insulating film is not less than 3.5 both in a dried state and in a moisture-absorbed state, each have an insulating coating with a thickness equivalent to that of the conventional art and low partial discharge inception voltage (high partial discharge inception voltage of not less than 980 Vp is not obtained).

Although the invention has been described with respect to the specific embodiment for complete and clear disclosure, the appended claims are not to be therefore limited but are to be construed as embodying all modifications and alternative constructions that may occur to one skilled in the art which fairly fall within the basic teaching herein set forth.

What is claimed is:

1. An insulated wire, comprising:
a conductor; and
an insulating coating on a periphery of the conductor,
wherein the insulating coating comprises an insulating film formed by applying and baking a polyester imide resin insulating coating material, and the insulating film has a relative permittivity of less than 3.5 both in a dried state and in a moisture-absorbed state,
wherein the polyester imide resin insulating coating material is consisted essentially of a solvent, an imide dicarboxylic acid, and an alcohol component, the imide dicarboxylic acid comprising a synthesized diamine component including aromatic diamine having not less than three aromatic rings and an acid component including aromatic tricarboxylic acid anhydride,
wherein the solvent includes an organic solvent, and the organic solvent includes cresol, and
wherein the aromatic diamine having not less than three aromatic rings is consisted of one selected from the group consisting of 2,2-bis[4-(4-aminophenoxy)phenyl]propane, bis[4-(4-aminophenoxy)phenyl]ether, and 4,4'-bis(4-aminophenoxy)biphenyl.

2. The insulated wire according to claim 1, wherein the aromatic diamine having not less than three aromatic rings is included in the diamine component at a rate of 30 to 100 mol %.

3. The insulated wire according to claim 1, wherein the insulating coating further comprises a resin layer comprising as a main component one selected from polyamide-imide resin, polyimide resin, polyester imide resin, and class H polyester resin.

4. A polyester imide resin insulating coating material for being applied and baked on a conductor to form an insulating film for an insulated wire, wherein the insulating film has a relative permittivity of less than 3.5 both in a dried state and in a moisture-absorbed state,
wherein the polyester imide resin insulating coating material is consisted essentially of a solvent, an imide dicarboxylic acid, and an alcohol component, the imide dicarboxylic acid comprising a synthesized diamine component including aromatic diamine having not less than three aromatic rings and an acid component including aromatic tricarboxylic acid anhydride,
wherein the solvent includes an organic solvent, and the organic solvent includes cresol, and
wherein the aromatic diamine having not less than three aromatic rings is consisted of one selected from the group consisting of 2,2-bis[4-(4-aminophenoxy)phenyl]propane, bis[4-(4-aminophenoxy)phenyl]ether, and 4,4'-bis(4-aminophenoxy)biphenyl.

5. The polyester imide resin insulating coating material according to claim 4, wherein the aromatic diamine having not less than three aromatic rings is included in the diamine component at a rate of 30 to 100 mol %.

6. A coil formed using the insulated wire according to claim 1.

7. The insulated wire according to claim 1, wherein the alcohol component comprises a polyhydric alcohol.

8. The insulated wire according to claim 1, wherein the alcohol component comprises one of dihydric alcohol including ethylene glycol (EG), neopentyl glycol, 1,4-butanediol, 1,6-hexanediol or 1,6-cyclohexane dimethanol, trihydric, glycerin (G), trimethylolpropane, and pentaerythritol.

9. The insulated wire according to claim 1, wherein the alcohol component comprises an alcohol with an isocyanurate ring including one of tris(hydroxymethyl) isocyanurate, tris(2-hydroxyethyl) isocyanurate (THEIC), and tris(3-hydroxypropyl) isocyanurate.

10. The insulated wire according to claim 1, wherein the imide dicarboxylic acid is esterified by a reaction with the alcohol component that includes one of tris(2-hydroxyethyl) isocyanurate (THEIC) and ethylene glycol (EG).

11. The insulated wire according to claim 1, wherein in a reaction of the imide dicarboxylic acid with the alcohol component, a molar ratio of the alcohol component to the acid component (OH/COOH) is in a range from 1.5 to 2.3.

12. The polyester imide resin insulating coating material according to claim 4, wherein the alcohol component comprises a polyhydric alcohol.

13. The polyester imide resin insulating coating material according to claim 4, wherein the alcohol component comprises one of dihydric alcohol including ethylene glycol (EG), neopentyl glycol, 1,4-butanediol, 1,6-hexanediol or 1,6-cyclohexane dimethanol, trihydric, glycerin (G), trimethylolpropane, and pentaerythritol.

14. The polyester imide resin insulating coating material according to claim 4, wherein the alcohol component comprises an alcohol with an isocyanurate ring including one of tris(hydroxymethyl) isocyanurate, tris(2-hydroxyethyl) isocyanurate (THEIC), and tris(3-hydroxypropyl) isocyanurate.

15. The polyester imide resin insulating coating material according to claim 4, wherein the imide dicarboxylic acid is esterified by a reaction with the alcohol component that includes one of tris(2-hydroxyethyl) isocyanurate (THEIC) and ethylene glycol (EG).

16. The polyester imide resin insulating coating material according to claim 4, wherein in a reaction of the imide dicarboxylic acid with the alcohol component, a molar ratio of the alcohol component to the acid component (OH/COOH) is in a range from 1.5 to 2.3.

17. The insulated wire according to claim 1, wherein the aromatic diamine includes one of bis[4-(4-aminophenoxy)phenyl]ether and 4,4'-bis(4-minophenoxy)biphenyl.

18. The insulated wire according to claim 1, wherein the insulating coating further comprises a resin layer comprising as a main component one selected from polyamide-imide resin, polyimide resin, and class H polyester resin.

19. The insulated wire according to claim 1, wherein the alcohol component comprises an alcohol with an isocyanurate ring including one of tris(hydroxymethyl) isocyanurate, and tris(3-hydroxypropyl) isocyanurate.

20. The polyester imide resin insulating coating material according to claim 4, wherein the aromatic diamine includes one of bis[4-(4-aminophenoxy)phenyl]ether and 4,4'-bis(4-minophenoxy)biphenyl, and
wherein the alcohol component comprises an alcohol with an isocyanurate ring including one of tris(hydroxymethyl) isocyanurate, and tris(3-hydroxypropyl) isocyanurate.

* * * * *